US010099577B2

(12) United States Patent
Runde

(10) Patent No.: US 10,099,577 B2
(45) Date of Patent: Oct. 16, 2018

(54) QUICK ADJUST POWER ADJUSTER WITH SPLIT NUT

(71) Applicant: Magna Seating Inc, Aurora (CA)

(72) Inventor: David M Runde, Beverly Hills, MI (US)

(73) Assignee: Magna Seating Inc, Aurora, Ontario (CA)

( * ) Notice: Subject to any disclaimer, the term of this patent is extended or adjusted under 35 U.S.C. 154(b) by 0 days.

(21) Appl. No.: 15/382,790

(22) Filed: Dec. 19, 2016

(65) Prior Publication Data
US 2017/0174103 A1 Jun. 22, 2017

Related U.S. Application Data

(60) Provisional application No. 62/269,504, filed on Dec. 18, 2015.

(51) Int. Cl.
F16H 1/24 (2006.01)
F16H 55/02 (2006.01)
B60N 2/06 (2006.01)
B60N 2/02 (2006.01)

(52) U.S. Cl.
CPC .......... *B60N 2/067* (2013.01); *B60N 2/0232* (2013.01)

(58) Field of Classification Search
CPC .... B60N 2/0232; B60N 2/067; F16H 25/2025
USPC ......................................... 74/424.78, 424.79
See application file for complete search history.

(56) References Cited

U.S. PATENT DOCUMENTS

| 3,777,516 A * | 12/1973 | Tigges ............... D06B 5/16 242/130.2 |
| 4,641,806 A | 2/1987 | Pipon et al. |
| 4,799,734 A | 1/1989 | Periou |
| 5,516,071 A | 5/1996 | Miyauchi |
| 5,582,461 A | 12/1996 | Pickles |
| 7,887,020 B2 | 2/2011 | Ferguson et al. |

FOREIGN PATENT DOCUMENTS

| DE | 202010001548 | 5/2010 |
| JP | 06226137 | 8/1994 |
| JP | 06226138 | 8/1994 |
| JP | 06226139 | 8/1994 |
| JP | 06226140 | 8/1994 |

* cited by examiner

Primary Examiner — Jake Cook
(74) Attorney, Agent, or Firm — Miller Canfield

(57) ABSTRACT

A power adjuster for adjusting an upper track relative to a lower track of a seat track assembly. An elongated lead screw extends axially between opposite fore and aft ends and is fixedly secured to the lower track. A driven assembly is selectively coupled to the lead screw for axial travel along the lead screw between the fore and aft ends. A drive assembly is fixedly coupled to the upper track and operatively coupled to the driven assembly for selectively rotating the driven assembly in opposite first and second directions for axial travel along the lead screw in a power operation mode. A release mechanism is coupled to the upper track and operable between a locked condition.

13 Claims, 12 Drawing Sheets

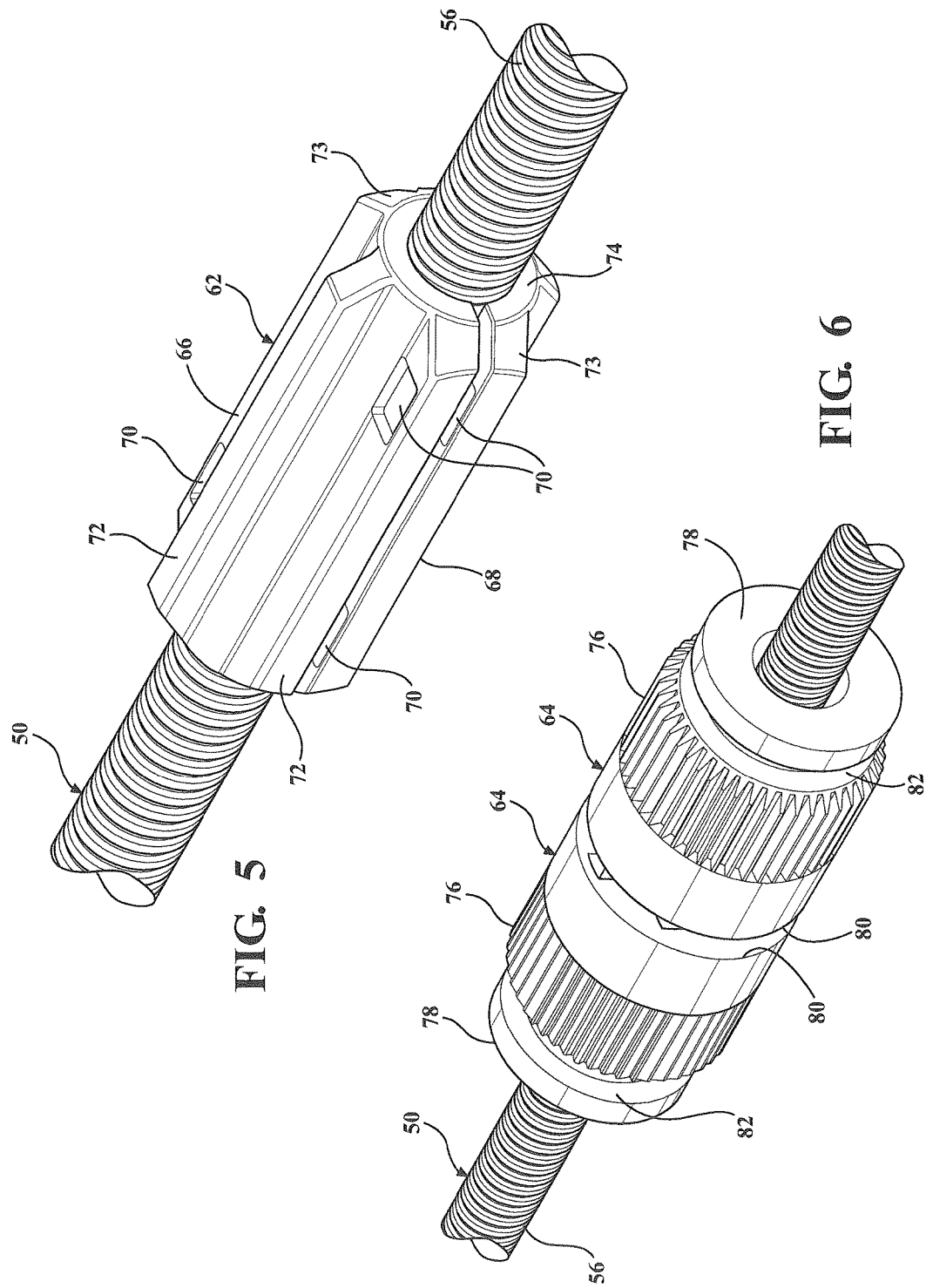

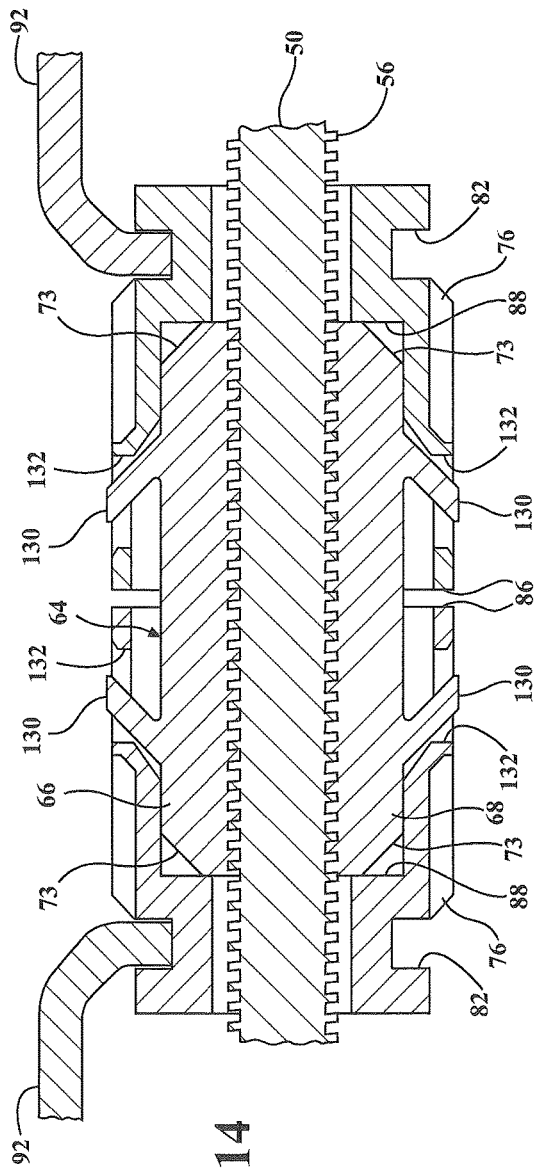
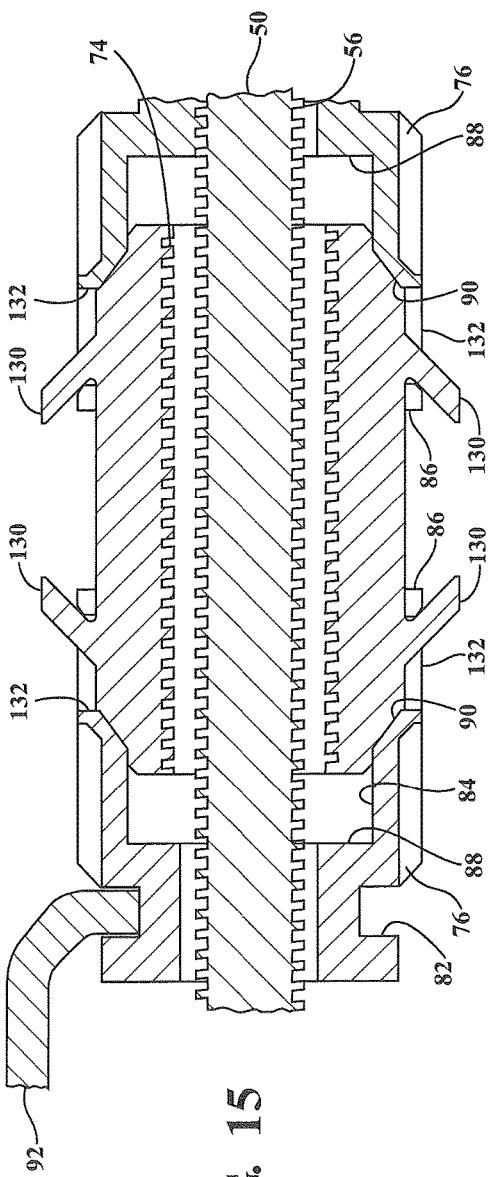
FIG. 14
FIG. 15

QUICK ADJUST POWER ADJUSTER WITH SPLIT NUT

CROSS-REFERENCE TO RELATED APPLICATIONS

This application claims priority to and all the benefits of U.S. Provisional Application No. 62/269,504, filed on Dec. 18, 2015.

BACKGROUND OF THE INVENTION

1. Field of the Invention

The invention relates to a quick adjust power adjuster for a seat track of an automotive vehicle seat assembly. More particularly, the invention relates to a quick adjust power adjuster having a split nut for selectively providing either powered or manual fore and aft movement of the seat assembly along a floor of an automotive vehicle.

2. Description of Related Art

Automotive vehicles include seat assemblies for supporting seat occupants within a passenger compartment of the vehicle. Typically, the seat assemblies include a generally horizontal seat cushion spaced above a floor of the vehicle and a generally vertical or upright seat back. The seat back is commonly operatively coupled to the seat cushion by a recliner assembly to allow for selective pivotal adjustment of the seat back relative m the seat cushion between a plurality of reclined seating positions. Many seat assemblies also include a seat track assembly coupled between the seat cushion and the floor to provide fore and aft movement of the seat assembly within the vehicle. Typically, the seat track assembly includes a lower track fixedly secured to the floor of the vehicle and an upper track slidably engaging the lower track. The upper track is fixedly secured to a bottom surface of the seat cushion to allow for sliding movement of the seat assembly along the lower track. It is well known in the vehicle seating art to provide a power seat track assembly driven by an electric motor for moving the upper track, and thus the seat assembly, relative to the lower track. Many such power seat track assemblies include a conventional gearbox or drive assembly operatively coupled in a longitudinal channel between the upper and lower tracks for converting rotational input of the motor into linear movement of the seat assembly. Several such examples are described in U.S. Pat. Nos. 8,226,063; 6,015,998; 6,575,421; 6,260,922; 5,816,555; 5,314,158; and 4,700,202. Typically, a threaded lead screw is fixedly secured to the lower track and the gearbox is operatively coupled between the lead screw and the upper track. The gearbox or drive assembly includes a housing having through holes or bores that are offset 90 degrees to align and retain a worm and a gear or worm wheel. The gear includes a threaded internal bore for threadably engaging the lead screw and a geared outer surface for meshing with the worm. In an arrangement of this kind, the worm is driven by a shaft extending from the motor which in turn causes the gear to rotate. Rotation of the gear causes the gear to move in a longitudinal direction along the fixed lead screw which leads to the desired movement of the upper track relative to the lower track.

However, the motor and drive assembly only provides powered fore and aft movement of the upper track relative to the lower track, and hence, the sliding fore and aft adjustment of the seat assembly. It is often desirable to quickly and manually move the seat assembly from a passenger fore/aft adjusted position to a full forward easy entry position wherein the upper track is moved forward along the lower track to a forward most position therebetween to allow easy access and entry into the vehicle behind the seat assembly.

SUMMARY OF THE INVENTION

According to one aspect of the invention, a power adjuster is provided for adjusting the position of an upper track relative to a lower track of a set track assembly. An elongated lead screw extends axially between opposite fore and aft ends and is adapted to be fixedly secured to the lower track. A driven assembly is selectively coupled to the lead screw for axial travel along the lead screw between the fore and aft ends. A drive assembly is adapted to be fixedly coupled to the upper track and operatively coupled to the driven assembly for selectively rotating the driven assembly in opposite first and second directions for axial travel along the lead screw in a power operation mode. And release mechanism in adapted to be coupled to the upper track and operable between a locked condition coupling the driven assembly to the lead screw in a closed position for axial travel along the lead screw in response to rotation of the drive assembly to slide the upper track relative to the lower track in the power operation mode and a unlocked condition decoupling the driven assembly from the lead screw to allow axial sliding movement of the drive and driven assemblies along the lead screw to slide the upper track relative to the lower track in a manual operation mode.

BRIEF DESCRIPTION OF THE DRAWINGS

Advantages of the present invention will be readily appreciated as the same becomes better understood by reference to the following detailed description when considered in connection with the accompanying drawings wherein:

FIG. 5 is an enlarged fragmentary perspective view of the lead screw and split nut;

FIG. 6 is a fragmentary perspective view of the split nut and drive nut of the driven assembly coupled to the lead screw;

FIG. 14 is a side cross-sectional view of an alternative embodiment of the split nut and drive nut in a closed position engaged with the lead screw in the power operation mode; and FIG. 15 is a side cross-sectional view of the split nut and drive nut of FIG. 14 in an open position decoupled from the lead screw in the manual operation mode.

DETAILED DESCRIPTION OF THE EMBODIMENTS

Figure 1:
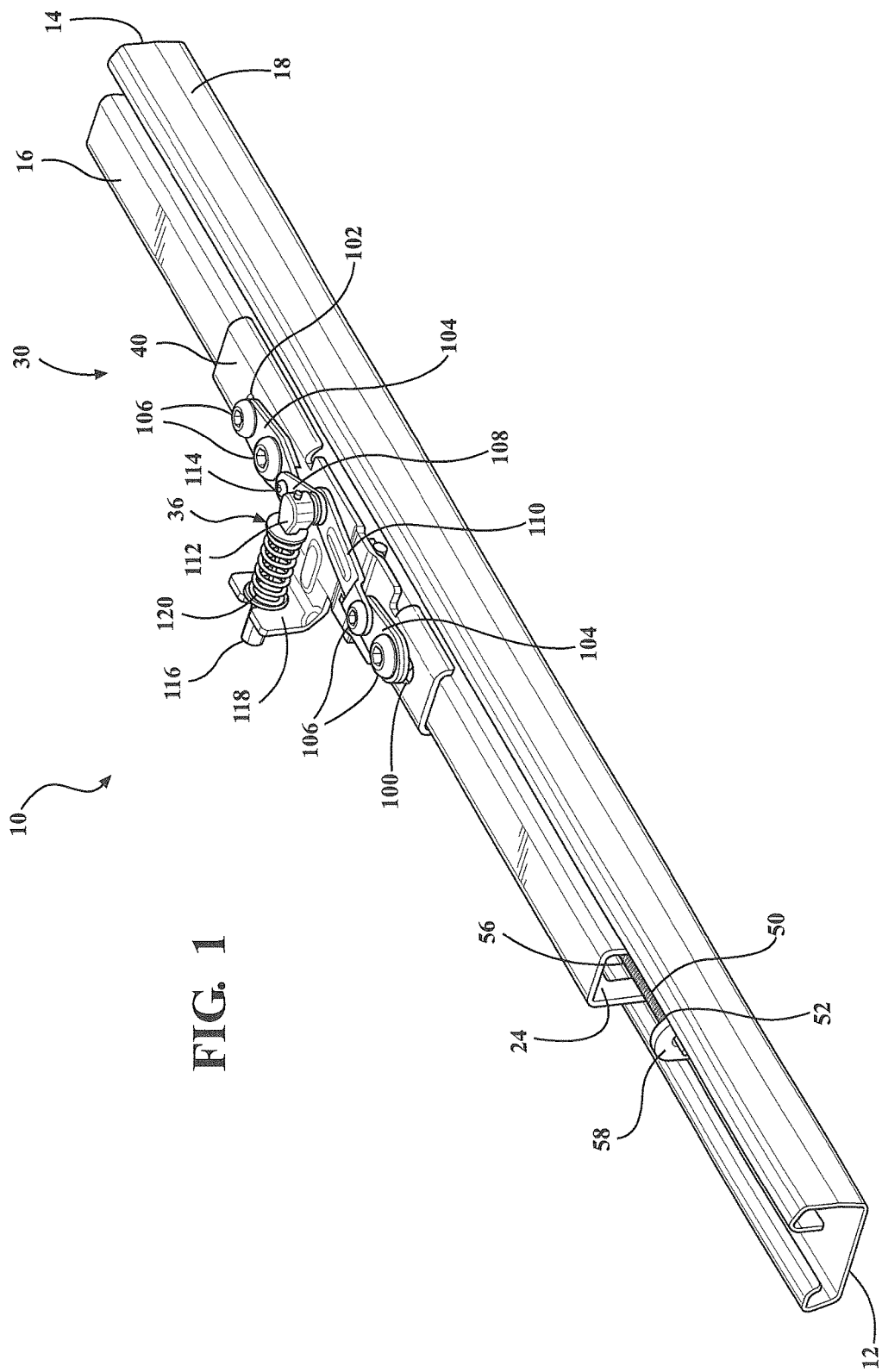
FIG. 1 is a perspective view of the seat track assembly and quick adjust power adjuster according to a preferred embodiment of the invention.

Referring to the Figures, wherein like numerals indicate like or corresponding parts throughout the several views, a seat track assembly 10 is generally shown in the Figures for providing both power and manual sliding, fore and aft movement of a seat assembly (not shown) in an automotive vehicle (not shown). The seat track assembly 10 extends longitudinally between opposite fore and aft ends 12, 14 and includes a generally inverted U-shaped upper track 16 slidably and matingly coupled to a generally U-shaped lower track 18 for providing fore and aft sliding movement of the upper track 16 relative to the lower track 18, as is commonly known in the art. The upper track 16 is adapted to be fixedly secured to the bottom side of a seat cushion of the seat assembly and the lower track 18 is adapted to be fixedly secured to the floor of the automotive vehicle as is commonly known in the art. The upper and lower tracks 16, 18 define a longitudinal internal channel 24 therebetween extending between the fore and aft ends 12, 14. It should be appreciated that an automotive seat assembly includes a pair of parallel and spaced apart seat track assemblies ID mounted between the bottom of the seat assembly and the floor of the vehicle for providing fore and aft sliding adjustment of the seat assembly within the vehicle as is also commonly known in the art.

Figure 2:
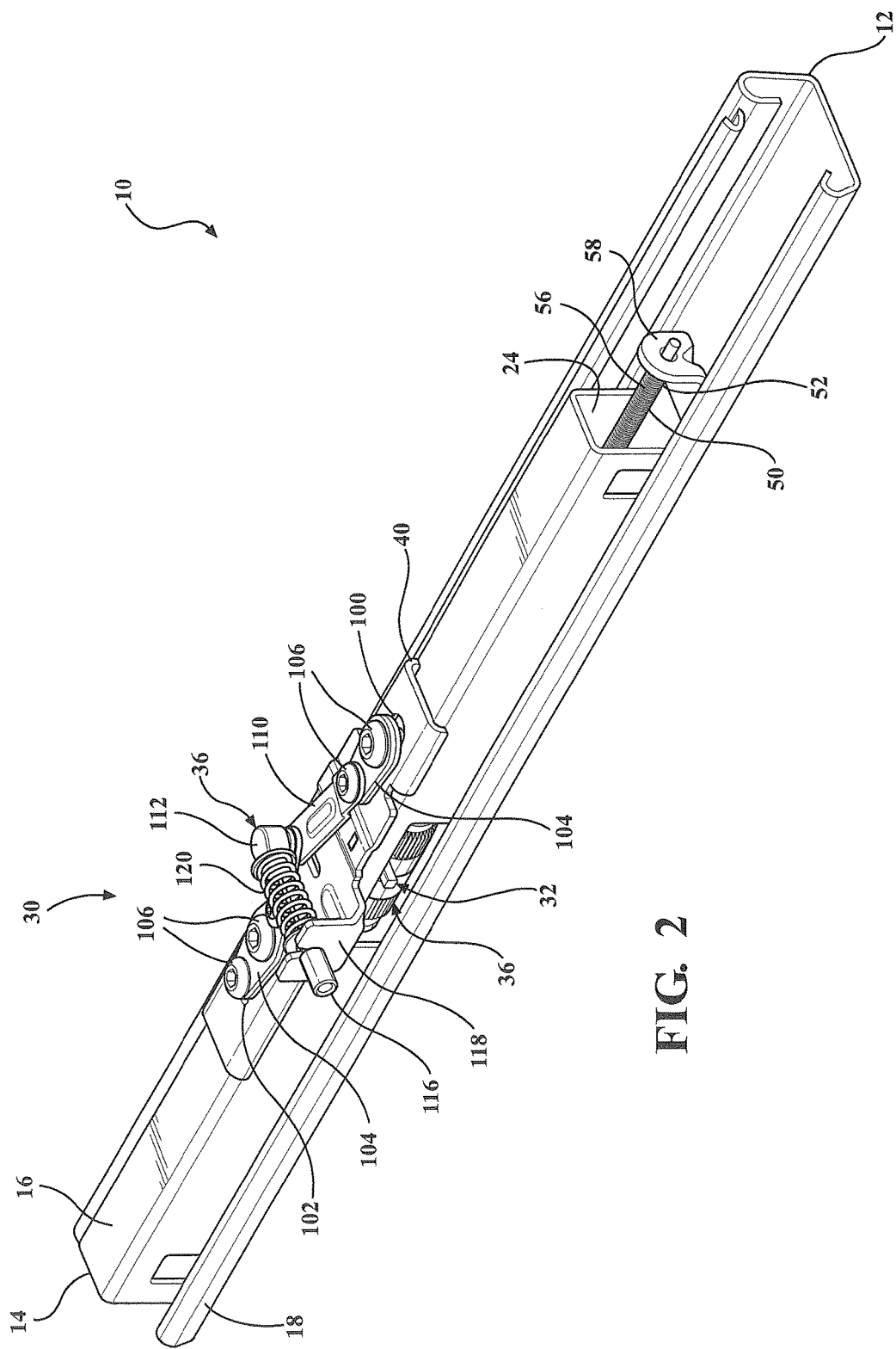
FIG. 2 is another perspective view of the seat track assembly and the quick adjust power adjuster in a locked condition with the seat track assembly in a passenger fore/aft adjusted position.

Referring to FIGS. 1 and 2, the seat track assembly 10 includes a quick adjust power adjuster 30, hereinafter power adjuster, is operatively coupled between the upper track 16 and lower track 18 for selectively providing either power or manual fore and aft sliding movement of the upper track 16 relative to the lower track 18. The power adjuster 30 includes a drive assembly 32, a driven assembly 34, and a release mechanism 36. The power adjuster 30 is disposed within the channel 24 and is operatively coupled between the upper track 16 and lower track 18. The power adjuster 30 drives the upper track 16 longitudinally, or linearly, fore and aft relative to the lower track 18 in response to rotary input by an electric motor (not shown) as is commonly known in the art. The power adjuster 30 includes a support bracket 40 fixedly secured to top portion of the upper track 18 approximately midway between the fore and aft ends 12, 14. The drive assembly 32 includes a worm gear 42 rotatably supported by a support plate 44 and seated transversely to the longitudinal length of the upper track 16 within the channel 24. The support plate 44 includes a pair of projecting tabs 46 extending through the upper track 16 and fixedly secured to the support bracket 40. The worm gear 42 further includes a drive shall 48 projecting through a side window 50 in the upper track 16 for connection to a powered electric motor (not shown) for rotatably driving the worm gear 42 in opposite first and second directions.

Figure 3:
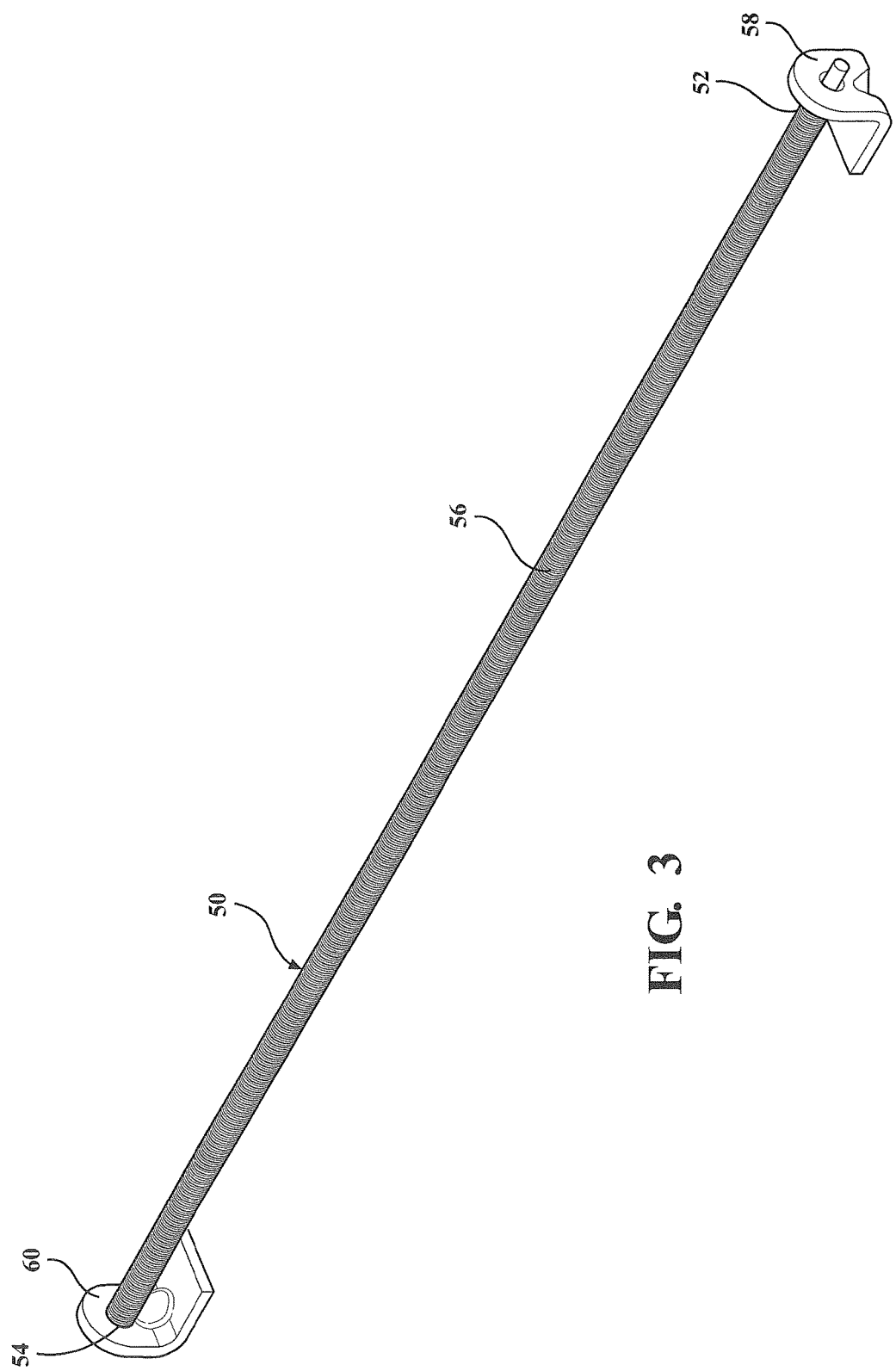
FIG. 3 is a perspective view of the lead screw of the seat track assembly.
Figure 4:
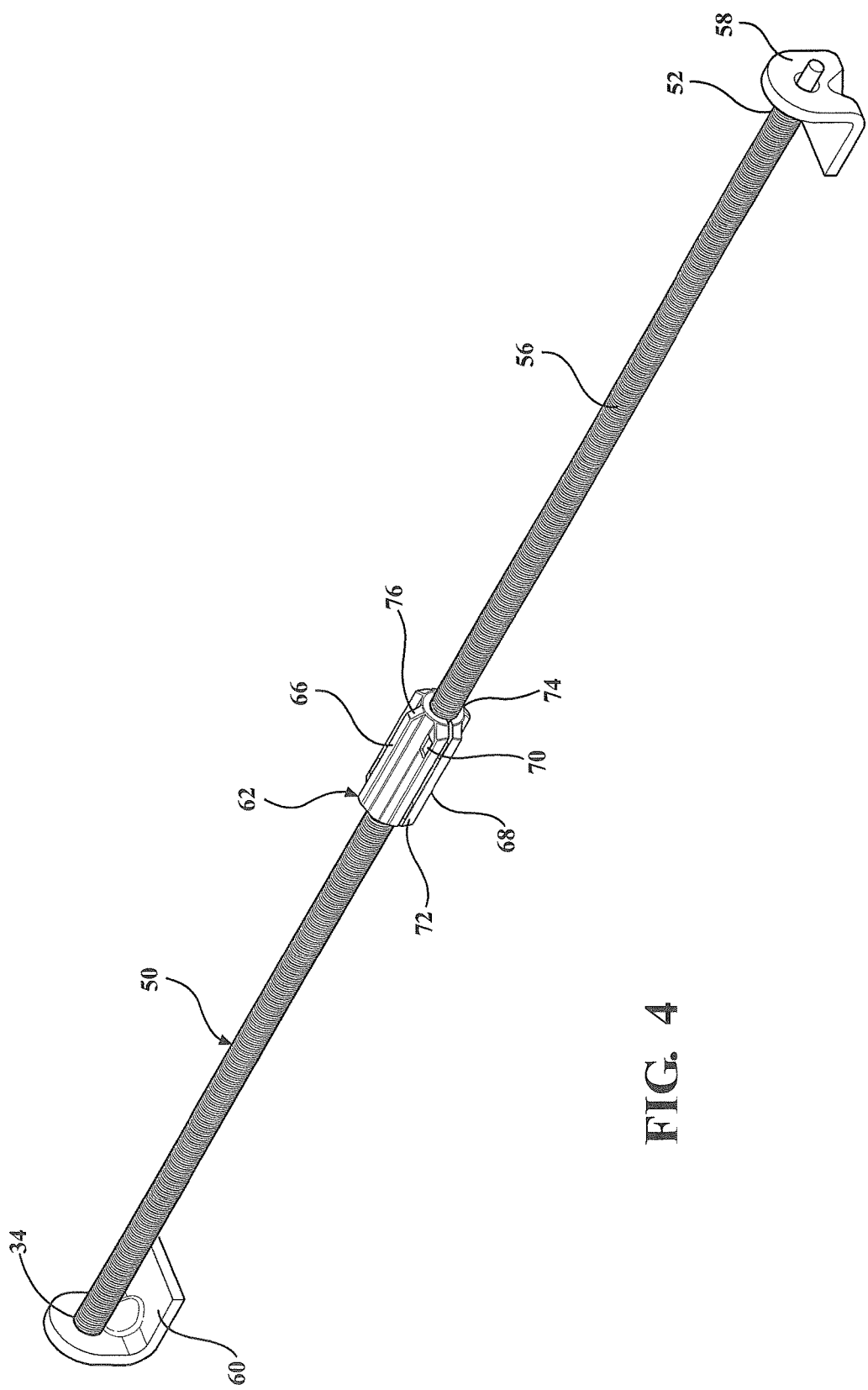
FIG. 4 is a perspective view of the lead screw and split out of the seat track assembly.

Referring to FIGS. 1-3, the drive assembly 32 further includes an elongated, cylindrical lead screw 50 extending axially between opposite fore and aft ends 52, 54. The lead screw 50 includes an external helical thread 56 extending between the fore and aft ends 52, 54. The lead screw 50 is fixedly mounted at each end 52, 54 to a respective mounting flange 58, 60 projecting upwardly from the bottom portion of the lower track 18 and adjacent opposing respective fore and aft ends 12, 14 of the lower track 18 with the channel 24.

Figure 7:
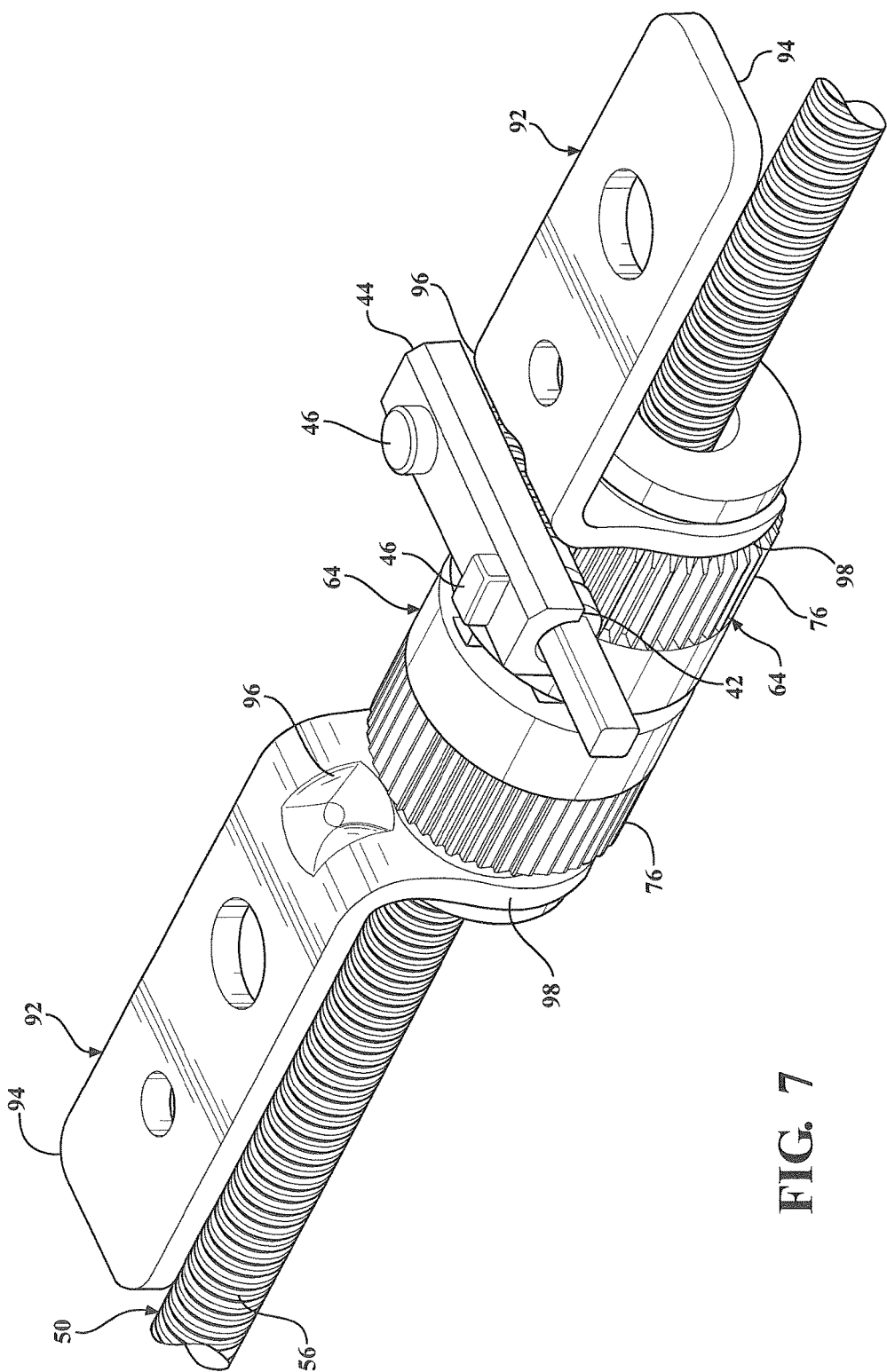
FIG. 7 is a fragmentary perspective view of the retainer straps and worm gear for actuating the drive nut on the lead screw.
Figure 11:
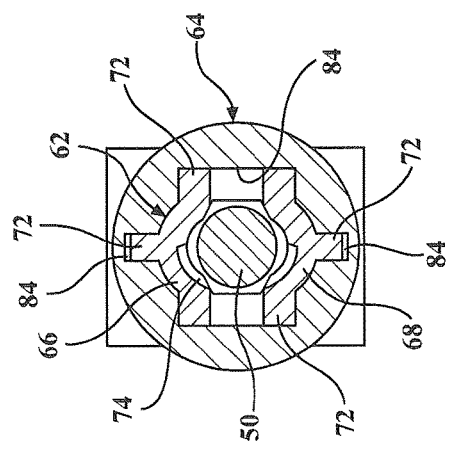
FIG. 11 is an end cross-sectional view of the lead screw, split nut and drive nut.

Referring to FIGS. 4-7, the driven assembly 34 includes an intercoupled split nut 62 and a pair of drive nuts 64 selectively coupled to the lead screw 50. The split nut 62, shown specifically in FIGS. 4 and 5, comprises elongated upper and lower halves 66, 68 separated and biased to a spaced apart open position by a plurality of spring tabs 70. The outer portion of each half 66, 68 of the split nut 62 includes a plurality of spaced apart and parallel axial raised ribs 72 ending with a ramped distal end 73 and the inner portion of each half 66, 68 includes an inner helical thread 74, shown in FIG. 11, for threaded engagement with the helical threads 56 on the lead screw 50 in a closed position as shown in FIG. 5. Referring to FIGS. 6, 7 and 11, each drive nut 64 includes an outer peripheral surface defined by a plurality of gear teeth 76 extending axial between opposite first and second ends 78, 80 for meshed engagement with the worm gear 42. A recessed groove 82 is formed around the first end 78. The inner surface of each drive out 64 includes a cylindrical through bore 84 for receiving the lead screw 50 axially therethrough and a plurality of spaced apart elongated notches 84 extending radially from the bore 84 and extending axially between an open end 86 adjacent the second end 80 and a closed end 88 adjacent the first lend 78 for sliding engagement with a respective one of the raised ribs 72 of the split nut 62. Each notch 84 further includes a ramped portion 90 between the open and closed ends 86, 88 for selective engagement with the ramped distal end 73 of the raised ribs 72 for moving the split nut halves 66, 68 from the open position, spaced radially from the lead screw 50, to the closed position, engaged with the lead screw 50.

Figure 8:
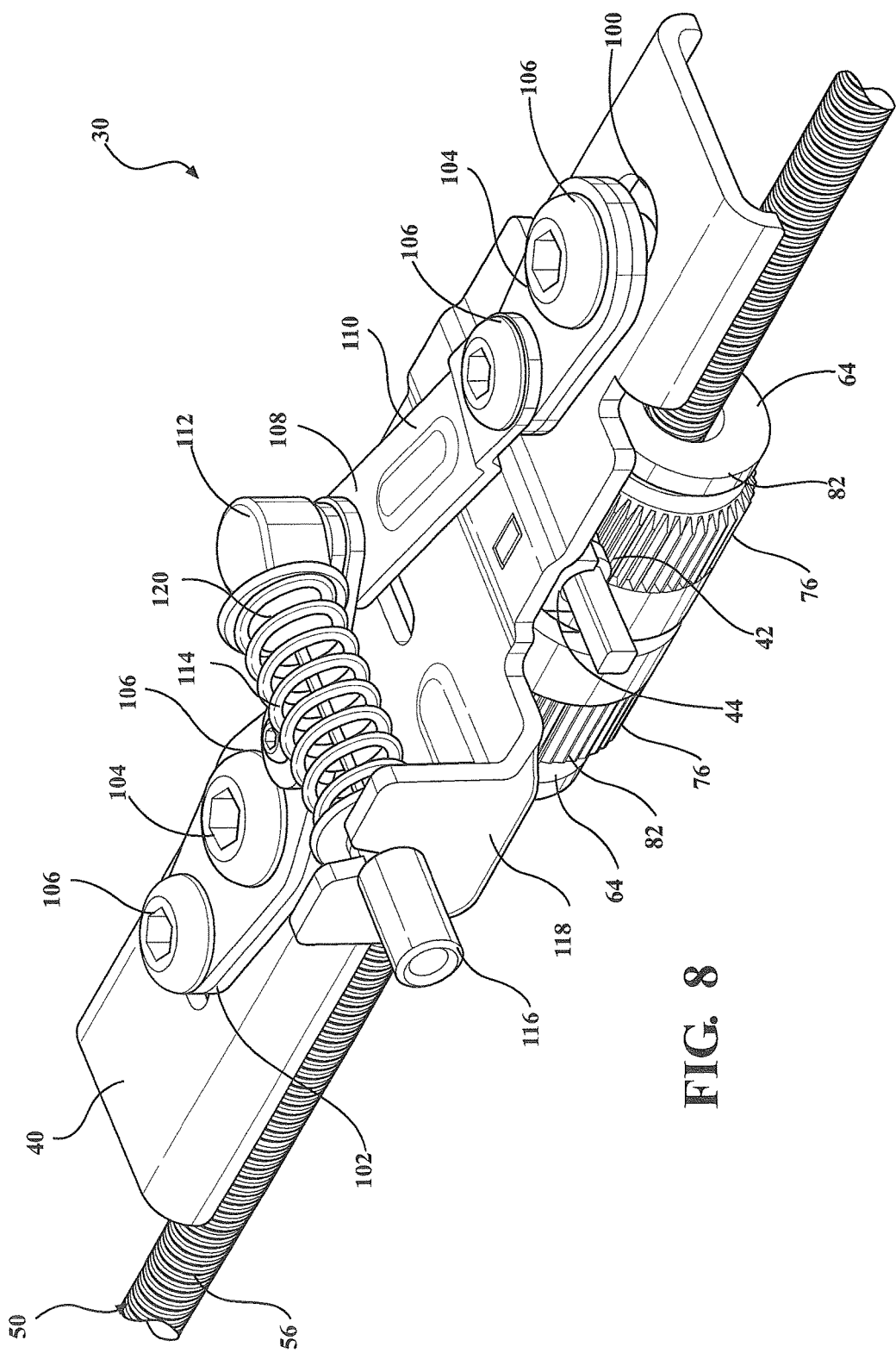
FIG. 8 is a fragmentary perspective view of the release mechanism of the quick adjust power adjuster.

Referring to FIGS. 7 and 8, the release mechanism 36 includes a pair of L-shaped retainer straps 92 coupled to the respective drive nut 64. More specifically, each retainer strap 92 includes a generally horizontal axially aligned top portion 94 and a downwardly extending support portion 96 having a pair of spaced apart arcuate legs 98 received in the recessed groove 82 in the first end 78 of the drive nuts 64 for rotatably supporting the drive nuts 64. The top portion 94 includes a pair of spaced apart holes 95 therethrough. The intercoupled lead screw 50, worm gear 42, split nut 62, drive nuts 64, and retainer straps 92 are all disposed within the channel 24 defined by the upper track 16.

Figure 9:
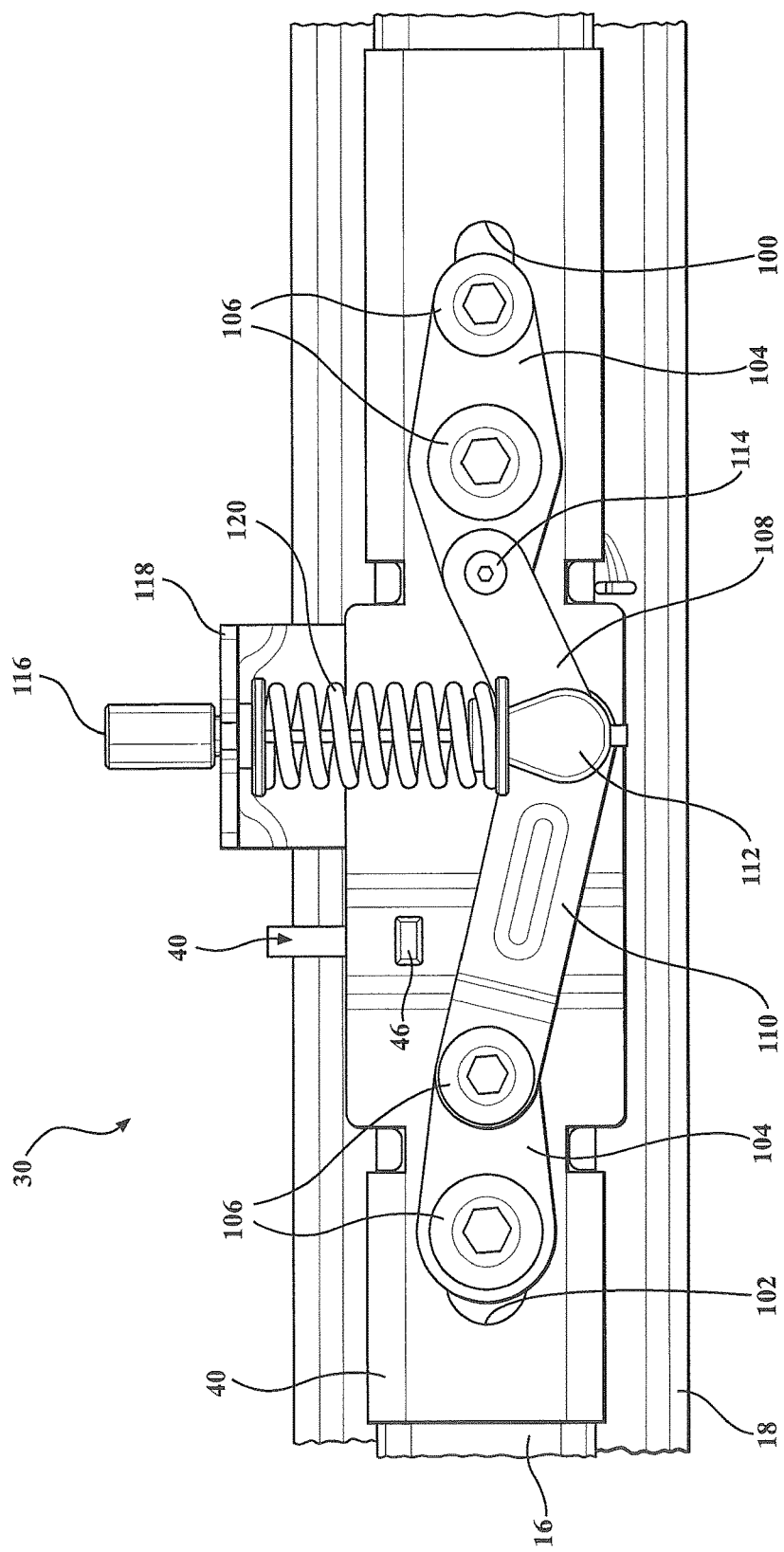
FIG. 9 is a top view of the release mechanism in the locked condition.
Figure 10:
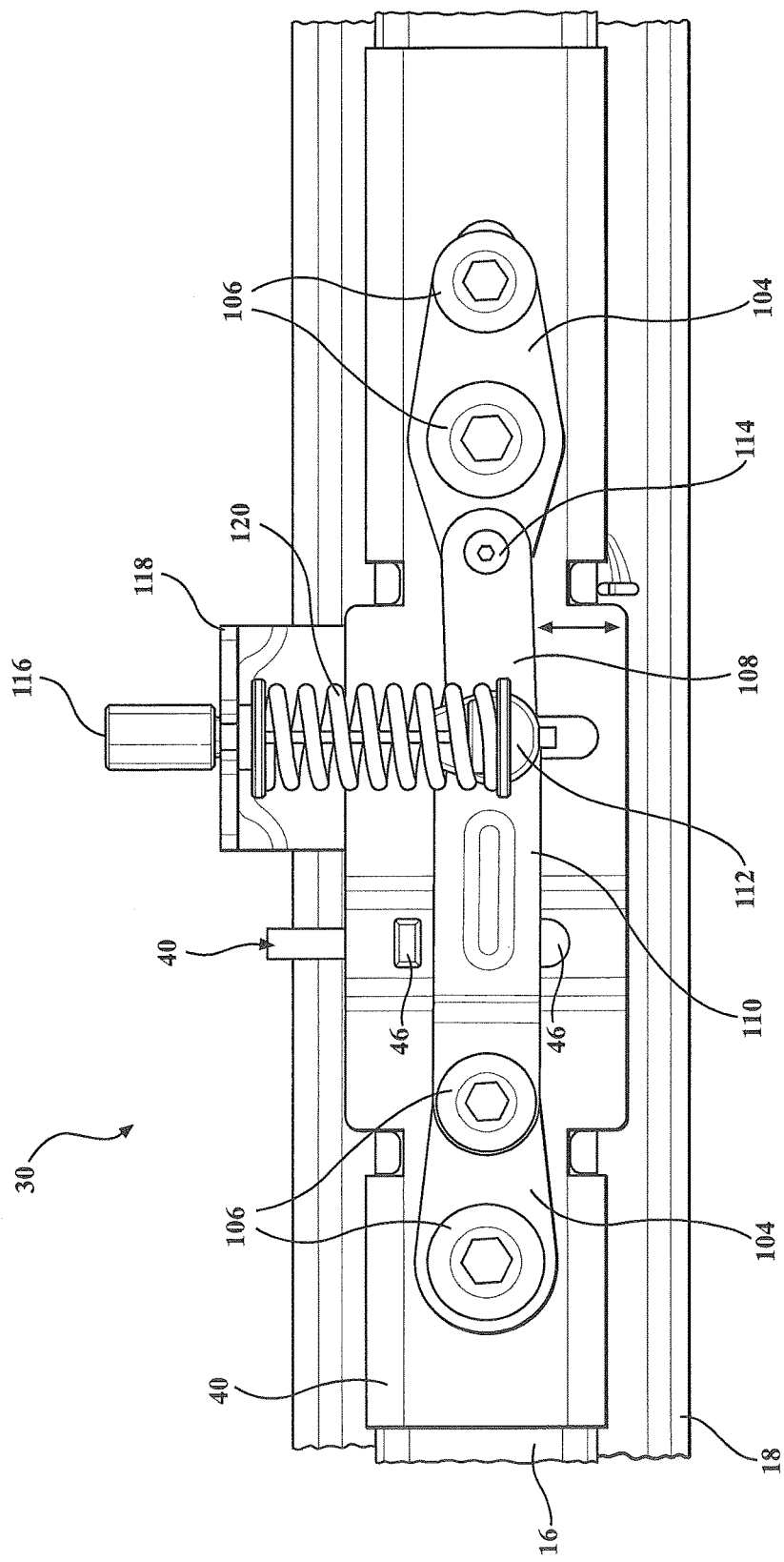
FIG. 10 is a top view of the release mechanism in the unlocked condition.

Referring to FIGS. 8-10, the support bracket 40 includes a pair of spaced apart elongated slots 100, 102 therein. The release mechanism 36 further includes a pair of slide links 104 covering each of the respective slots 100, 102. A pair of guide pins 106 extend through the slide links 104, slots 100, 102 and holes 95 to interconnect the slide links 104 to the respective top portion 94 of the retainer straps 92. The release mechanism 36 also includes a first and second control link 108, 110 pivotally interconnected at first ends by pivot post 112. The opposite second end of first control link 108 is pivotally connected to one of the slide links 104 by pivot pin 114. The opposite second send of the second control link 110 is pivotally connected to the other slide link 104 by one of the guide pins 106. A Bowden-type push-pull cable 116, or other actuator, is connected to the pivot post 112 and supported by a flange 118 projecting from the support bracket 40. Finally, a coil spring 120 is compressed between the flange 118 and the pivot post 112 for biasing the pivot post 112 away from the flange 118. The pivot post 112 is slidably coupled and guided in a transverse slot 122 in the center of the support bracket 40.

Referring now to FIGS. 1 and 2, the seat track assembly 10 is shown in a fore/aft seat adjusted position for seat occupant comfort. Referring to FIGS. 9-13, in operation, the quick adjust power adjuster 30 drives the upper track 16 longitudinally, or linearly, fore and aft relative to the lower track 18 in response to rotary input by an electric drive motor (not shown but commonly known in the art). More specifically, the release mechanism 36 of the power adjuster 30 is in a locked condition, FIGS. 9 and 12, wherein the coil spring 120 biases the pivot post 112 laterally spaced away from the flange 118 and pushing outwardly on the first ends of the control links 108, 110 to shorten the effective length between the second ends of the control links 108, 110. In this locked condition, the control links 108, 110 pull on the guide pins 106 and this slide links 104 to slide along the respective slots 100, 102 towards each other. The guide pins 106 are connected to the retainer straps 92 which are in turn connected to the drive nuts 64 to force the drive nuts 64 to slide axially towards each other along the split nut 62. The raised ribs 72 on the split nut 62 received in the notches 84 in the drive nuts 64 guide the sliding movement of the drive nuts 64 relative to the split nut 62. The ramped portions 90 in the notches 84 of the drive nut 64 engage the ramped distal ends 73 of the raised ribs 72 to force or compress the halves 66, 68 radially towards each other to a closed position with the inner helical threads 74 meshed with the external helical threads 56 of the lead screw 50. With the release mechanism 36 in the locked condition and the split nut 62 in the closed position, the electric motor may be actuated to rotate the worm gear 42 of the drive assembly 32 in first or second rotational directions as is commonly known in the art. It should be appreciated that the electric motor may have an output drive shaft connected directly to the worm gear 42 or have a cable or other flexible shaft extending between and interconnecting the output shaft of the electric motor with the worm gear 42. Rotation of the worm gear 42 in a first rotational direction causes rotation of the drive nut 64. The engagement of the notches 84 of the drive nut 64 with the raised ribs 72 of the split nut 62 causes the split nut 62 to rotate with the drive nut 64. The meshed engagement of the split nut 62 with the helical thread 56 of the lead screw 50 causes the split nut 62 an drive nut 64 to travel longitudinally along the lead screw 50 between the fore and aft ends 52, 54. Since the drive assembly 32 and driven assembly 34 are coupled to the upper track 16 by the support bracket 40, the drive assembly 32 and driven assembly 34 force the upper track 16 to move longitudinally fore and aft along the lower track 18 in a powered operation mode for seat occupant adjustment of the seat track assembly 10 and automotive seat within the vehicle.

Figure 13:
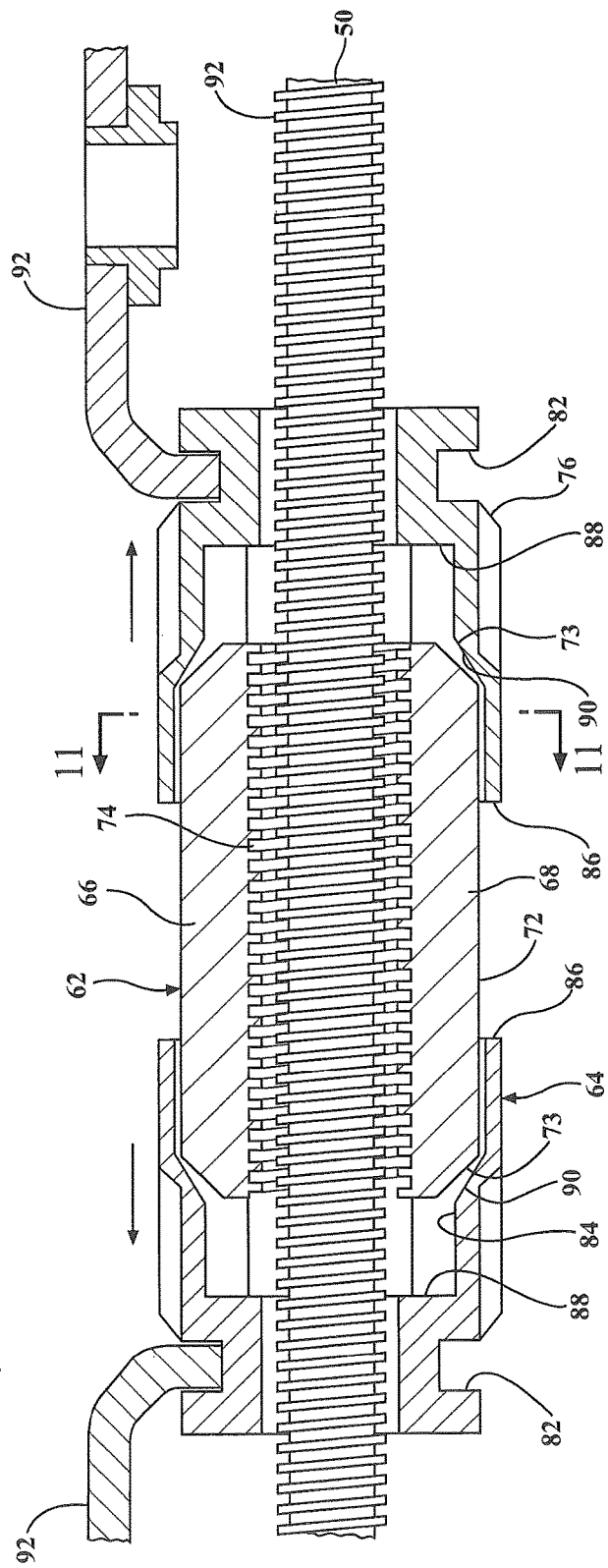
FIG. 13 is a side cross-sectional view of the quick adjust power adjuster in a manual operation mode.
Figure 12:
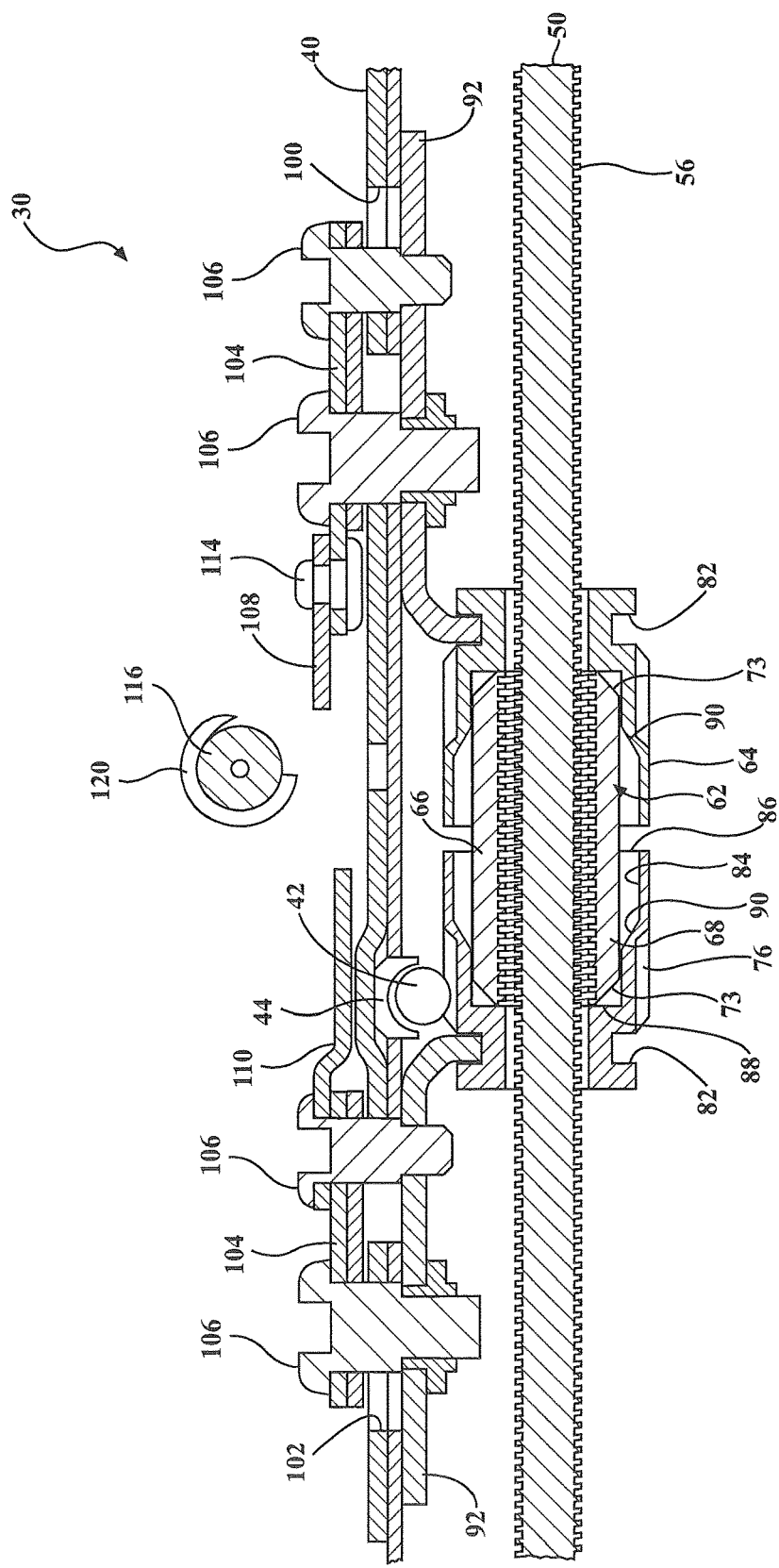
FIG. 12 is a side cross-sectional view of the quick adjust power adjuster in a power operation mode.

Referring to FIGS. 10 and 13, the cable 116 may be pulled to actuate and pivot the release mechanism 36 to an unlocked condition, wherein the drive assembly 32 and driven assembly 34 are decoupled from engagement with the lead screw 50, referred to as the manual operation mode, and the upper track 16 is free to move longitudinally fore and aft along the lower track 18 without actuation of the electric motor from the seat adjusted fore/aft position to a forwardmost position along the lower track 18, defined as an easy entry position, to allow access behind the seat assembly within the vehicle. More specifically, referring to FIGS. 9 and 10, pulling the cable 116 compresses the coil spring 120 and pivots the control links 108, 110 about the pivot post 112 to slide the slide links 104 axially along the slots 100, 102 away from each other. The guide pins 106 in turn force the retainer straps 92 to move axially apart pulling the opposite facing drive nuts 64 to an open position as shown in FIG. 13.

In the open position, the split nut 62 slides along the notches wherein the ramped portion 90 increases the width or diameter to the notches 84 adjacent the open end 86 to thereby allow the spring tabs 70 to expand and open the halves 66, 68 of the split nut 62 spaced from meshed engagement with the helical thread 56 of the lead screw 50. With the split nut 62 in the open position, the power adjuster 30 is unlocked to freely slide along the lead screw 50 thereby allowing the upper track 16 to move axially along the lower track 18 in the manual operation mode.

Finally, the seat track assembly 10 may be manually returned from the easy entry position to the fore/aft seat adjusted position by manually sliding the upper track 16 longitudinally along the lower track 18. Upon return to the fore/aft seat adjusted position, the release mechanism 36 returns to the locked condition forcing the split nut 62 to return to the closed position in meshed engagement with the lead screw 50 to prevent further sliding movement of the of the power adjuster 30 along the lead screw 50 and allow for continued use in the power operation mode as previously described.

Referring to FIGS. 14 and 15, an alternative embodiment of the split nut 62 and drive nut 64 is shown in the open and closed positions. In the alternative embodiment, each half 66, 68 of the split nut 62 includes a pair of spaced apart angled or ramped fingers 130 projecting radially outwardly therefrom and passing through corresponding slots 132 adjacent the second end 80 of the drive nuts 64 to mechanically intercouple the halves 66, 68 of the split nut 62 and the drive nuts 64. In operation, with the release mechanism 36 in the locked condition, the control links 108, 110 slide the retainer straps 92 along the slots 100, 102 axially towards each other as described above. The ramped portions 90 in the notches 84 of the drive nut 64 engage the ramped distal ends 73 of the raised ribs 72 to force compress the halves 66, 68 radially towards each other to the closed position with the inner helical threads 74 meshed with the external helical threads 56 of the lead screw 50 as described above and as shown in FIG. 14 for use in the power operation mode.

Upon actuation of the release mechanism 36 to the unlocked condition, the control links 108, 110 pivot to slide the retainer straps 92 along the slots 100, 102 and separate the drive nuts 64 axially apart as described above. The slots 132 in the drive nuts 64 engage with the ramped fingers 130 to pull the halves 66, 68 of the split nut 62 radially apart and spaced from engagement with the lead screw 50 in the open position shown in FIG. 15 for use in the manual operation mode.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:
1. A power adjuster for adjusting the position of an upper track relative to a lower track of a seat track assembly comprising:
    an elongated lead screw extending axially between opposite fore and aft ends and adapted to be fixedly secured to the lower track;
    a driven assembly selectively coupled to said lead screw for axial travel along said lead screw between said fore and aft ends;

a drive assembly adapted to be fixedly coupled to the upper track and operatively coupled to said driven assembly for selectively rotating said driven assembly in opposite first and second directions for axial travel along said lead screw in a power operation mode; and a release mechanism adapted to be coupled to said upper track and operable between a locked condition coupling said driven assembly to said lead screw in a closed position for axial travel along said lead screw in response to rotation of said drive assembly to slide the upper track relative to the lower track in said power operation mode and an unlocked condition decoupling said driven assembly from said lead screw in an open position to allow axial sliding movement of said drive and driven assemblies along said lead screw to slide the upper track relative to the lower track in a manual operation mode;

wherein said drive assembly includes a rotatable worm gear in meshed engagement with said driven assembly for rotatably driving said driven assembly axially along said lead screw in response to rotation of said worm gear in said power operation mode; and wherein said driven assembly includes a split nut operable between said open position decoupled from said lead screw and said closed position coupled to said lead screw and a first drive nut operatively coupled between said worm gear and said split nut actuating said split nut between said open and closed positions in response to actuation of said release mechanism between said unlocked and locked conditions.

2. The power adjuster as set forth in claim 1 wherein said split nut includes opposing first and second halves operable between said open position spaced apart from said lead screw and said closed position in meshed engagement with said lead screw.

3. The power adjuster as set forth in claim 2 wherein said driven assembly comprises a second drive nut and the first and second drive nuts forming a pair of drive nuts slidably coupled to said first and second halves of said split nut for actuating said halves between said open position and said closed position in response to actuation of said release mechanism between said unlocked and locked conditions.

4. The power adjuster as set forth in claim 3 wherein said lead screw includes an external helical thread extending between fore and aft ends thereof and said split nut includes inner helical threads for threaded meshed engagement with said helical thread of said lead screw in said closed position.

5. The power adjuster as set forth in claim 4 wherein at least one of said drive nuts includes gear teeth for meshed engagement with said worm gear for rotatably driving said split nut axially along said lead screw in said closed position in response to rotation of said worm gear in said power operation mode.

6. The power adjuster as set forth in claim 5 wherein said release mechanism includes a pair of retainer straps rotatably supporting said respective pair of drive nuts to allow rotation of said drive nuts between said worm gear and said split nut.

7. The power adjuster as set forth in claim 6 wherein said release mechanism includes a support bracket adapted to fixedly mount said release mechanism to the upper track.

8. The power adjuster as set forth in claim 7 wherein said release mechanism includes a slide link fixedly coupled to each of said retainer straps and slidably coupled to said support bracket for axial sliding movement along the upper track.

9. The power adjuster as set forth in claim 8 wherein said release mechanism includes first and second control links pivotally interconnected at first ends and pivotally connected to said slide links at opposite second ends for sliding said slide links along said support bracket.

10. The power adjuster as set forth in claim 9 wherein said release mechanism includes an actuator operatively coupled to said first ends of said control links for pivoting said control links in response to actuation of said release mechanism between said locked and unlocked condition and further actuating said split nut between said closed and open position.

11. The power adjuster as set forth in claim 10 wherein said release mechanism includes a bias spring coupled between said actuator and said control links for biasing said release mechanism to said locked condition.

12. The power adjuster as set forth in claim 11 wherein said split nut includes a plurality of spring tabs between said halves for biasing said split nut to said open position spaced from engagement with said lead screw.

13. The power adjuster as set forth in claim 11 wherein said split nut includes a plurality of ramped fingers for engagement with said drive nuts for moving said halves to said open position spaced from engagement with said lead screw in response to actuation of said release mechanism to said unlocked condition.

* * * * *